US008745988B2

(12) United States Patent
Verhiel et al.

(10) Patent No.: US 8,745,988 B2
(45) Date of Patent: Jun. 10, 2014

(54) PIN FIN ARRANGEMENT FOR HEAT SHIELD OF GAS TURBINE ENGINE

(75) Inventors: Jeffrey Verhiel, Toronto (CA); Honza Stastny, Georgetown (CA); Robert Sze, Mississauga (CA)

(73) Assignee: Pratt & Whitney Canada Corp., Longueuil (CA)

( * ) Notice: Subject to any disclaimer, the term of this patent is extended or adjusted under 35 U.S.C. 154(b) by 112 days.

(21) Appl. No.: 13/226,031

(22) Filed: Sep. 6, 2011

(65) Prior Publication Data
US 2013/0055722 A1   Mar. 7, 2013

(51) Int. Cl.
*F02C 1/00* (2006.01)

(52) U.S. Cl.
USPC ........................................................ 60/752

(58) Field of Classification Search
CPC ... F23R 3/002; F23R 3/06; F23R 2900/03043
USPC .................................................. 60/752–760
See application file for complete search history.

(56) References Cited

U.S. PATENT DOCUMENTS

| | | | |
|---|---|---|---|
| 2,993,337 A * | 7/1961 | Cheeseman | 60/757 |
| 4,292,810 A * | 10/1981 | Glenn | 60/757 |
| 4,446,693 A | 5/1984 | Pidcock et al. | |
| 5,024,058 A | 6/1991 | Shekleton et al. | |
| 5,419,115 A * | 5/1995 | Butler et al. | 60/804 |
| 5,695,320 A | 12/1997 | Kercher | |
| 5,738,493 A | 4/1998 | Lee et al. | |
| 6,000,908 A | 12/1999 | Bunker | |
| 6,029,455 A | 2/2000 | Sandelis | |
| 6,282,905 B1 | 9/2001 | Sato et al. | |
| 6,341,485 B1 | 1/2002 | Liebe | |
| 6,408,628 B1 | 6/2002 | Pidcock et al. | |
| 6,484,505 B1 | 11/2002 | Brown et al. | |
| 6,578,627 B1 | 6/2003 | Liu et al. | |
| 6,681,578 B1 | 1/2004 | Bunker | |
| 6,842,980 B2 * | 1/2005 | Young et al. | 29/889.2 |
| 7,093,439 B2 | 8/2006 | Pacheco-Tougas et al. | |
| 7,104,067 B2 | 9/2006 | Bunker | |
| 7,363,763 B2 | 4/2008 | Coughlan, III et al. | |
| 7,694,522 B2 | 4/2010 | Nakae et al. | |
| 7,707,835 B2 | 5/2010 | Lipinski et al. | |
| 7,748,221 B2 | 7/2010 | Patel et al. | |
| 7,757,492 B2 | 7/2010 | Intile et al. | |
| 7,926,278 B2 | 4/2011 | Gerendás et al. | |
| 2002/0056277 A1 * | 5/2002 | Parry | 60/752 |
| 2008/0115499 A1 * | 5/2008 | Patel et al. | 60/752 |
| 2010/0229563 A1 | 9/2010 | Woolford et al. | |

* cited by examiner

*Primary Examiner* — Phutthiwat Wongwian
(74) *Attorney, Agent, or Firm* — Norton Rose Fulbright Canada LLP

(57) ABSTRACT

A heat shield unit for a gas turbine engine combustor comprises a panel body secured to a combustor liner. A first surface of the body is oriented toward a combustion zone of a combustor. A second surface is oriented toward the liner. The body is separated into upstream and downstream portions. Pin fins project from the second surface of the body. The pin fins are arranged in arrays of at least two different densities of volume of pin fins per unit volume. One density, lower than the second density, is in the upstream portion and another in the downstream portion of the body. Connectors connect the body to the liner with a line between the upstream and downstream portions of the body aligned with fluid-coolant injection apertures in the liner. A gas turbine engine combustor and a method for cooling a heat shield unit in a combustor liner of a gas turbine engine are also provided.

15 Claims, 4 Drawing Sheets

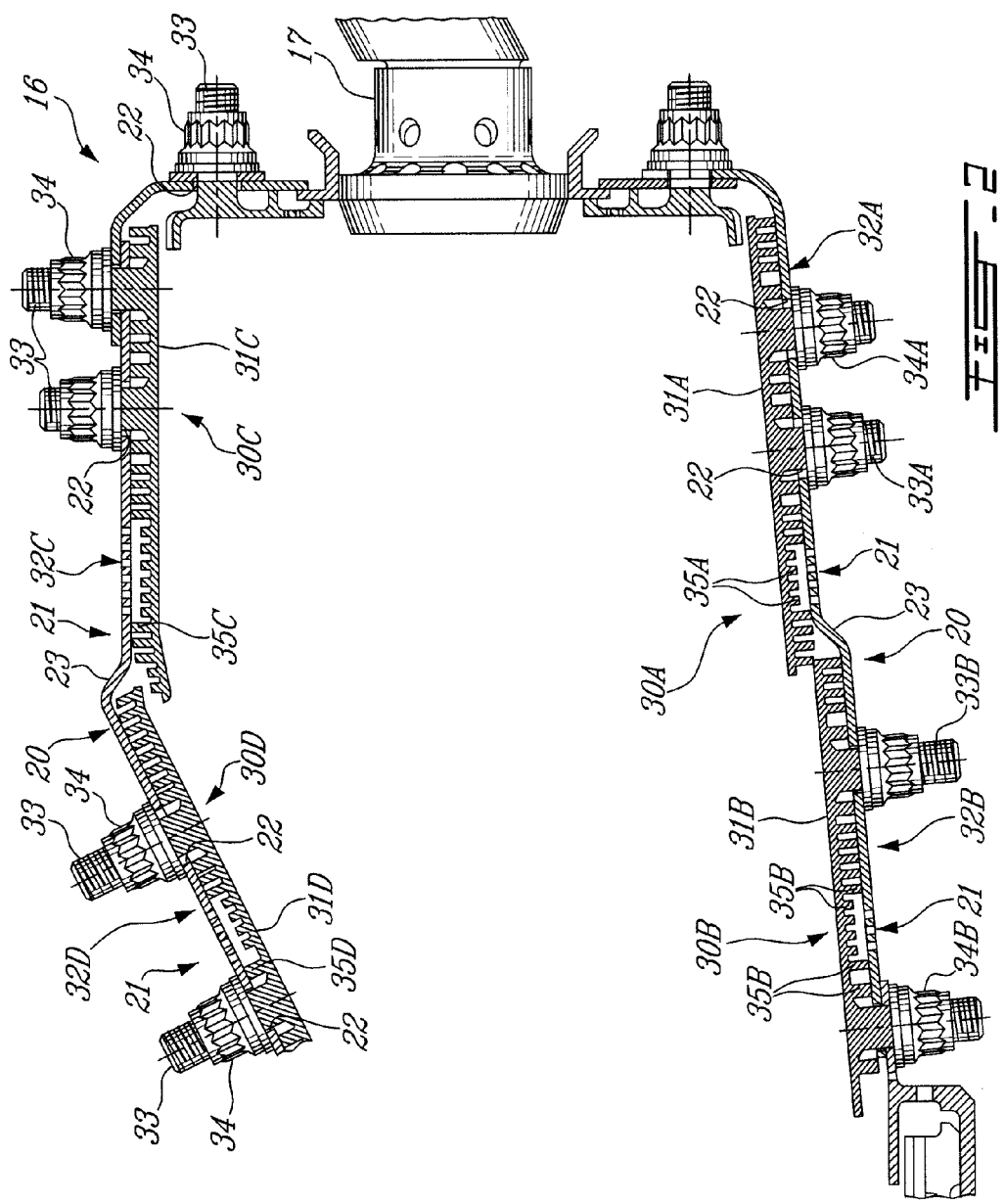

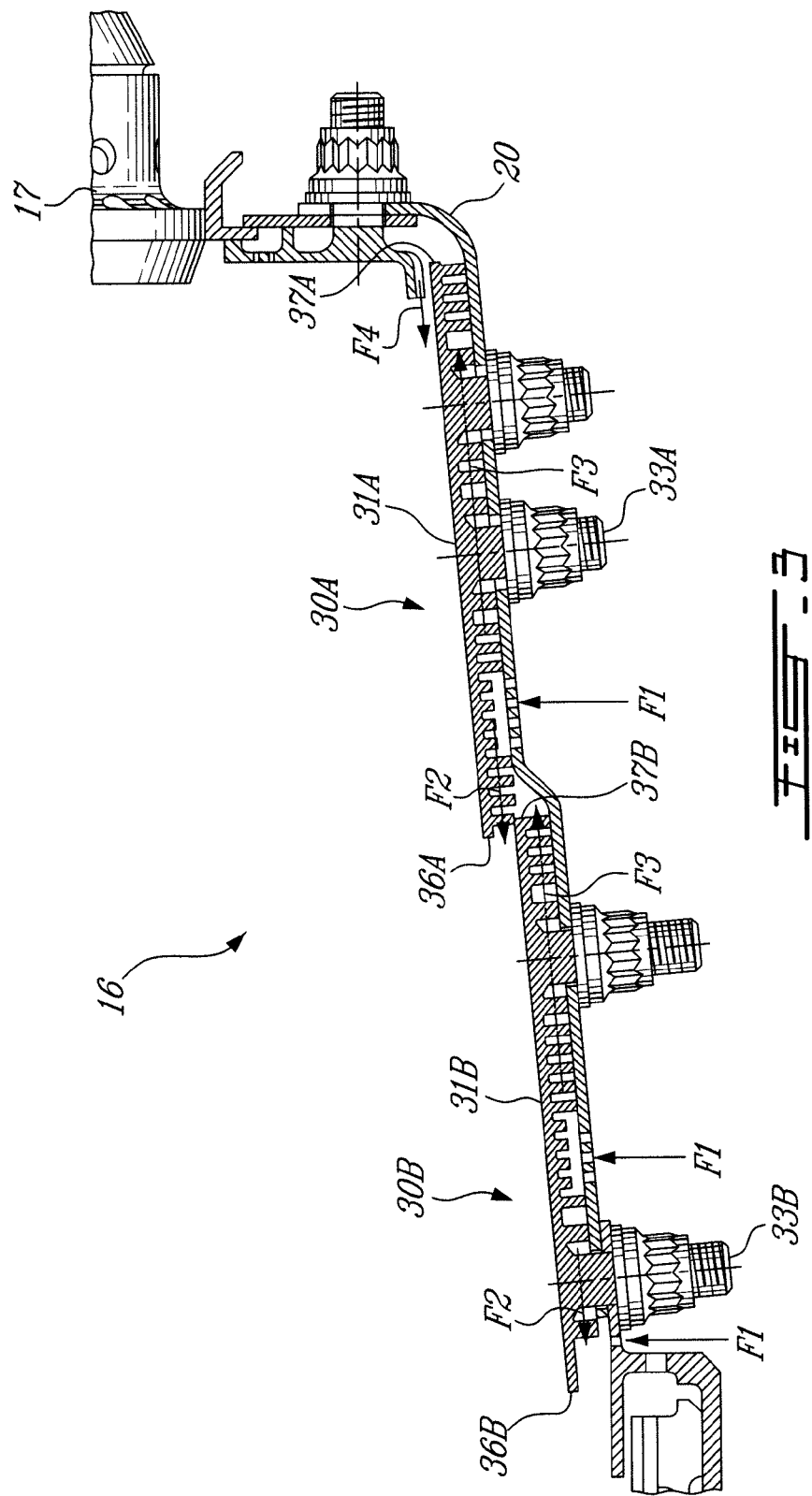

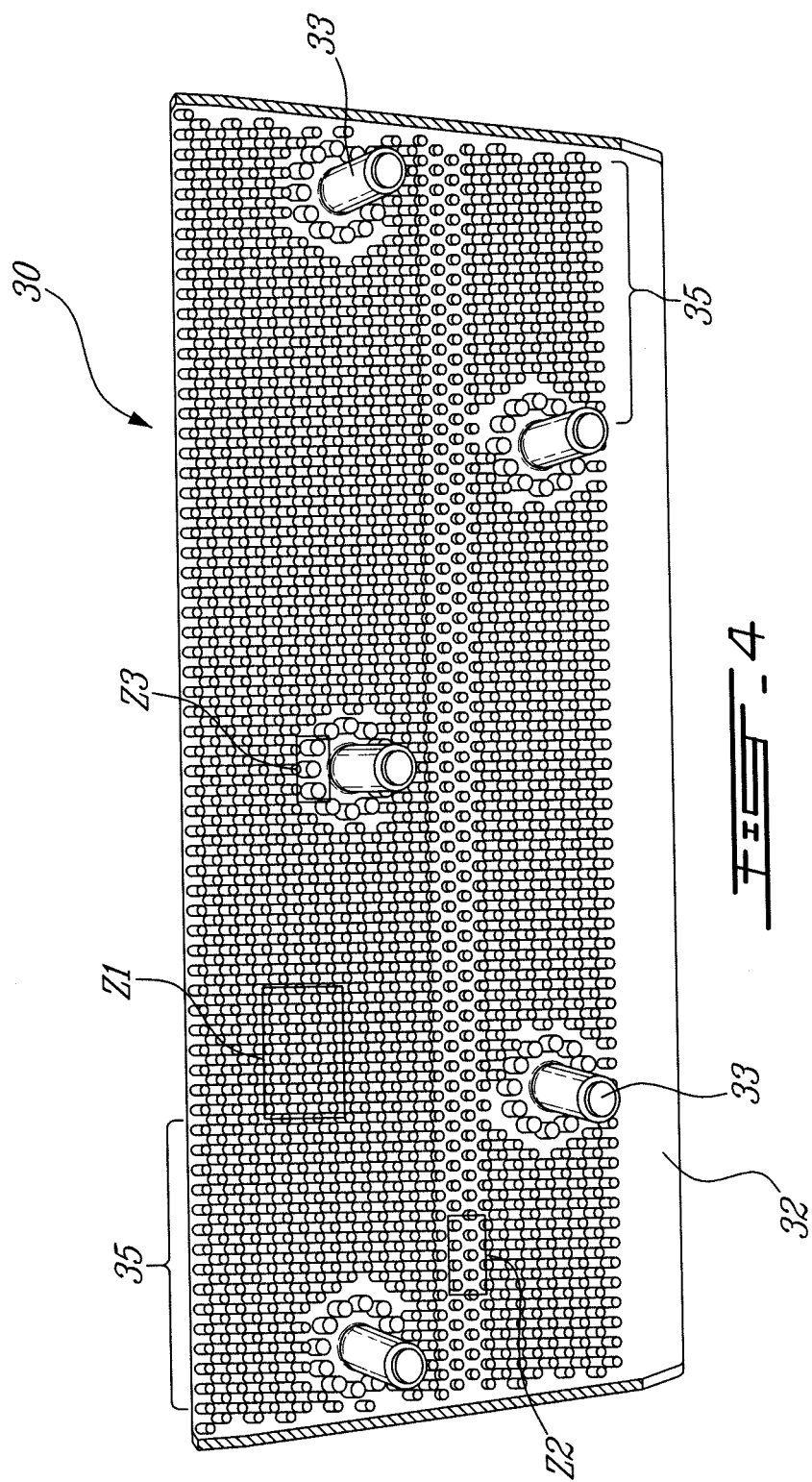

PIN FIN ARRANGEMENT FOR HEAT SHIELD OF GAS TURBINE ENGINE

TECHNICAL FIELD

The present application pertains to aircraft gas turbine engines and, more particularly, to heat shields found in a combustor of the gas turbine engine and to a pin fin arrangement of such a heat shield for cooling purposes.

BACKGROUND OF THE ART

In gas turbine engines, the combustor performance directly impacts the overall fuel efficiency of the gas turbine engine and the pollutant emission. Heat shields, also known as float walls, have therefore been provided within combustors to allow the combustor to operate at higher temperatures with relatively low combustor pressure drops. As a result, the specific field consumption of gas turbine engines is enhanced.

For cooling purposes, the heat shields may be equipped with a plurality of pin fins oriented away from the combustion zone of the combustor. A coolant fluid circulates between the pin fins, thereby cooling the heat shields. Spent coolant fluid is then directed onto the exposed surface of the heat shields to perform film cooling. The fluid coolants are therefore used for two different types of cooling, namely internally through the pin array and externally via film cooling.

Fresh coolant fluid is introduced where film cooling effectiveness dies. Accordingly, coolant fluid introduction has an impact on the axial length of the heat shields. To ensure optimal coolant distribution, some circumferential rails and like deflectors have been added among pin fin arrays. However, such rails may introduce undesirable extra contact points, extra hot spots and stiffness discontinuity and this may have an impact on the overall durability of the heat shields.

SUMMARY

According to a first embodiment, there is provided a heat shield unit for a gas turbine engine combustor, comprising: a panel body adapted to be secured to a combustor liner, the panel body having a first surface adapted to be oriented toward a combustion zone of a combustor, and a second surface adapted to be oriented toward the combustor liner, the panel body being separated in an upstream portion and a downstream portion; pin fins projecting from the second surface of the panel body, the pin fins being arranged in arrays of at least two different densities of volume of pin fins per unit volume, with one said densities in the upstream portion and another said densities in the downstream portion of the panel body, with a first density of the at least two different densities being lower than a second density of the at least two different densities; and connectors to connect the panel body to the combustor liner with a line between the upstream portion and the downstream portion of the panel body being aligned with fluid-coolant injection apertures in the combustor liner.

According to a second embodiment, there is provided a gas turbine engine combustor, comprising: a combustor liner defining a combustion volume, with apertures in the combustor liner for insertion of coolant fluid in the combustion volume; and at least one heat shield unit comprising a panel body secured to the combustor liner, the panel body having a first surface oriented toward the combustion zone, and a second surface oriented toward the combustor liner, pin fins projecting from the second surface of the panel body, the pin fins being arranged in arrays of at least two different densities of volume of pin fins per unit volume, with a first density of the at least two different densities being lower than a second density of the at least two different densities, with the panel body positioned relative to the apertures of the combustor liner for a location of the pin fins between the at least two densities to receive the coolant fluid, and connectors to connect the panel body to the combustor liner.

According to a third embodiment, there is provided a method for cooling a heat shield unit in a combustor liner of a gas turbine engine, the heat shield unit secured to the combustor liner and defining a gap therewith with pin fins projecting from the heat shield unit toward the combustor liner in the gap, the method comprising: injecting coolant fluid into the gap through apertures in the combustor liner; directing a first portion of said coolant fluid in a first direction through a first array of the pin fins; and directing a second portion of said coolant fluid in a second direction through a second array of the pin fins, the second portion of said coolant fluid having a greater volumetric flow value than that of the first portion of said coolant fluid by having a density of pin fins per unit volume in the second array different than a density of pin fins per unit volume in the first array.

DESCRIPTION OF THE DRAWINGS

FIG. 2 is a sectional view of a combustor of the gas turbine engine of FIG. 1, with the heat shield units of the present disclosure;

FIG. 3 is a sectional view of the combustor with heat shield units of FIG. 2, showing a flow of cooling air; and FIG. 4 is a perspective view of one of the heat shield units of FIG. 2, showing a pin fin distribution.

DETAILED DESCRIPTION OF THE PREFERRED EMBODIMENTS

Figure 1:
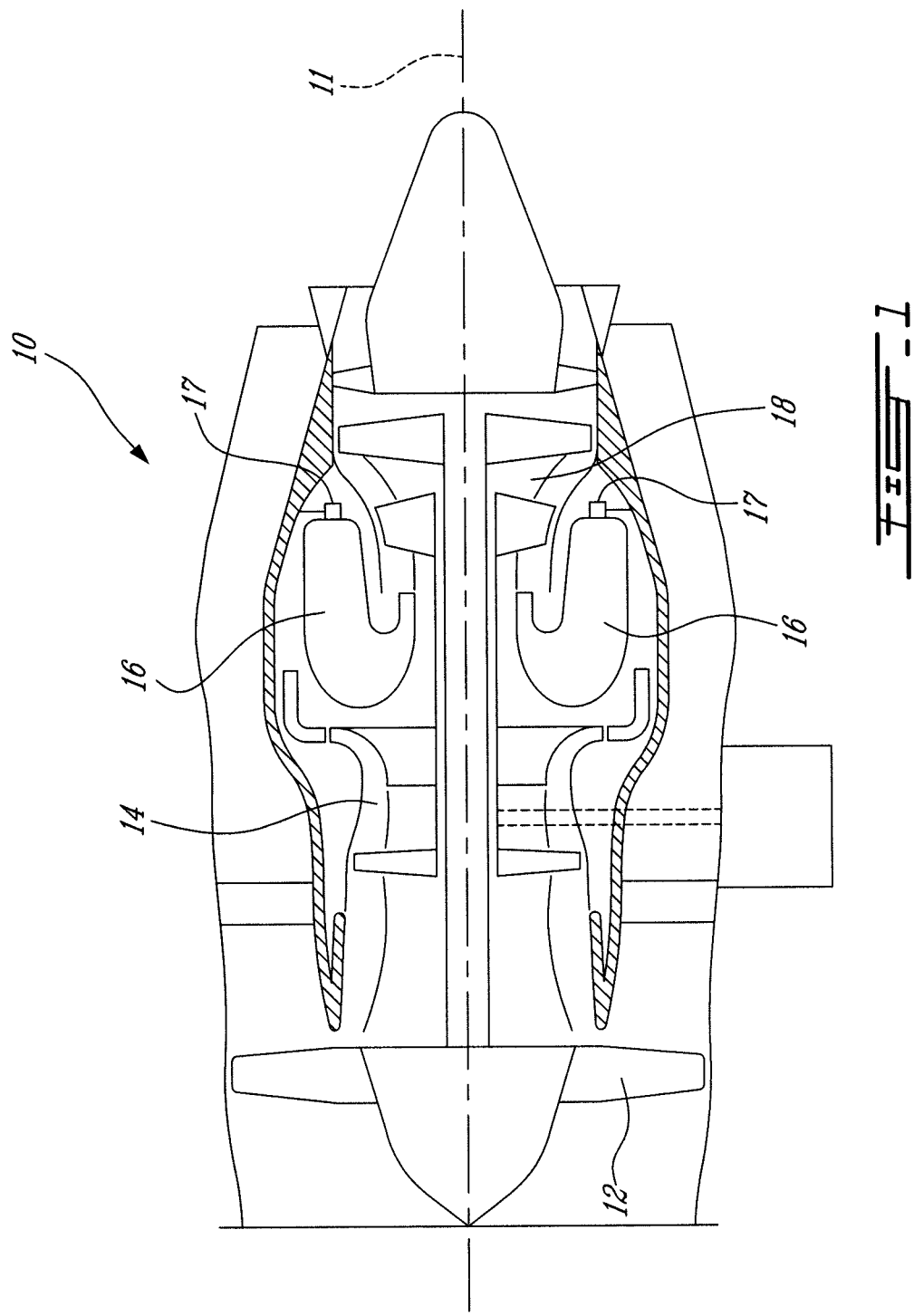
FIG. 1 is a schematic view of a gas turbine engine, featuring heat shield units in accordance with an embodiment of the present disclosure.

FIG. 1 illustrates a turbofan gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases. Jet nozzles are illustrated at 17 relative to the combustor 16. A turbine section 18 extracts energy from the combustion gases.

Referring to FIG. 2, a section of the combustor 16 is generally illustrated. The combustor 16 has a combustor liner 20 mounted about the fuel nozzle 17 and projecting downstream from the fuel nozzle 17. Therefore, the combustor liner 20 defines an inner volume in which combustion occurs (i.e., combustion zone). Jet apertures 21 (i.e., jets) are defined in various locations of the combustor liner 20, for the insertion of coolant fluid in the combustor 16. The jets 21 may be used to provide coolant fluid to heat shields mounted onto the combustor liner 20. Connection bores 22 are provided in the combustor liner 20. The connection bores 22 may be used to anchor the heat shields to the combustor liner 20. The combustor liner 20 may feature offsetting sections 23 to form a step-like shape to the combustor liner 20 in a downstream direction.

Referring concurrently to FIGS. 2 and 3, a plurality of heat shield units 30 are shown as being secured to the combustor liner 20. The heat shield units 30 may also be known as float walls, etc. It is pointed out that in FIGS. 2 and 3, the numerous heat shield units 30 and components thereof have reference numerals affixed with an A, B, etc, to be individually identified for subsequent description of the flow of coolant fluid. However, reference will be made in the text to the heat shield units 30 and components without affixed letters unless the description is specific to a given heat shield unit 30.

The heat shield units 30 each have a panel body with a first surface 31 and a second surface 32. The panel body is railless, i.e., it does not feature rails or like elongated member extending on the surfaces 31 and 32. The first surface is relatively smooth and continuous and is oriented internally relative to the combustor 16, i.e., faces the combustion zone. The second surface 32 therefore faces toward the combustor liner 20.

Connector posts 33 project from the second surface 32 of the heat shield units 30. The connector posts 33 are spaced apart from one another to be in register with the connection bores 22 in the combustor liner 20. Accordingly, when the heat shield units 30 are anchored to the combustor liner 20, the connector posts 33 are threaded through the connection bores 22.

Fasteners 34 (e.g., nuts, washers, rings, etc) are operatively connected to the connector posts 33 so as to releasably fix the heat shield units 30 to the combustor liner 20. Free ends of the connector posts 33 and the fasteners 34 therefore project outside of the combustor liner 20 (e.g., in the plenum of the gas turbine engine).

Any other connection means may be used to secure the heat shield units 30 to the combustor liner 20, including blots, tabs, brackets, etc.

Referring concurrently to FIGS. 2 to 4, pin fins are illustrated as 35. The pin fins 35 are arranged in arrays of multiple pin fins (as best seen in FIG. 4), whereby only a few of the pin fins are actually labeled, to simplify the illustrations. The pin fins 35 are illustrated as having a circular section. However, any other appropriate shape of pin fins 35 is considered. In FIG. 4, the pin fins 35 are shown forming to different zones, each zone regrouping similar pin fins 35. As shown in zone Z1, the pin fins 35 have a same diameter, height and are spaced apart evenly, thereby defining a first density of pin fins (e.g., pin fin volume per total volume unit, pin fin area per total surface unit). As seen in zone Z2, some fins adjacent to the fins of zone Z1 may be spaced apart further than the pin fins of zone Z1. Accordingly, the density of pin fins in zone Z2 is lower than that of zone Z1. Fuel coolant circulation is enhanced when the pin fin density is lower.

Moreover, according to another embodiment, the pin fins of zone Z1 are shown having a greater height than the pin fins of zone Z2, causing a lower volume density of fins in zone Z2. Again, the array of pin fins within zone Z2 causes less restriction of flow than that of zone Z1, because of the reduced height. The array of pin fins of zone Z2 is particularly well suited to be opposite the jets 21 to allow coolant to flow into the combustor 16 from the adjacent plenum. FIGS. 2 and 3 therefore show shorter pin fins 35 opposite the jets 21.

In zone Z3, there are pin fins with a diameter greater than that of zone Z1 or Z2. The arrangement of zone Z3 is therefore of lesser density than that of zone Z1, thereby causing less flow restriction. The larger pin fins may be less efficient in terms of cooling efficient. However, zone Z3 is adjacent to connector posts 33 which may act as heats sink to cool the heat shield units 30.

Accordingly, FIG. 4 shows that the pin fins 35 on the second surface 32 of the heat shield units 30 may be arranged in different ways to alter the density of pin fins on the second surface 32 of the heat shield units 30. The density of pin fins of a heat shield 30 is therefore selected to dictate the flow of coolant fluid, with a volumetric flow value of the coolant fluid (e.g., cubic feet per minute) being greater if the density of pin fins is smaller. An example thereof is illustrated in FIG. 3. A coolant fluid from the plenum is shown entering the combustor 16, at F1. With specific reference to the heat shield unit 30A, a portion of the fluid F1 is directed along a downstream portion of the heat shield unit 30A as shown by direction F2. Therefore, the coolant fluid flows downstream of a trailing edge 36A of the heat shield unit 30A to film cool the heat shield unit 30B. A second portion of the coolant fluid F1 is directed along an upstream portion of the heat shield unit 30A as shown as F3. The coolant fluid F3 travels upstream and beyond the leading edge 37A of the heat shield unit 30A to then film cool the heat shield unit 30A, as shown by F4. To perform the above-referred distribution of fluid flow, the pin fin arrays upstream of the jets 21 associated with the heat shield unit 30A may be of a smaller density than the pin fins downstream of these jets 21. The heat shield unit 30A must therefore be installed with the jets 21 being aligned with a line separating the upstream portion from the downstream portion of the heat shield unit 30A.

Similarly, coolant fluid F1 entering the jets 21 opposite the heat shield unit 30B moves upstream according to direction F3, at which point the coolant fluid may be used to film cool the heat shield unit 30B, by passing beyond leading edge 37B, while a portion of the coolant fluid flows in direction F2, to film cool the downstream heat shield unit 30, etc.

Therefore, the flow of coolant fluid is split using a pressure differential induced by providing varying pin fin resistance, by selecting appropriate densities of pin fins. The pin fins 35 may have any pin height, diameter, section size, shape, etc. to affect the density and cause such flow restrictions to induce the appropriate pressure differential to dictate the flow of coolant fluid.

What is claimed is:

1. A heat shield unit for a gas turbine engine combustor, comprising:
    a panel body adapted to be secured to a combustor liner, the panel body having a first surface adapted to be oriented toward a combustion zone of a combustor, and a second surface adapted to be oriented toward the combustor liner, the panel body as a whole being railless and being separated in an upstream portion and a downstream portion;
    pin fins projecting from the second surface of the panel body, the pin fins being arranged in arrays of at least two different densities of volume of pin fins per unit volume, with one said densities in the upstream portion and another said densities in the downstream portion of the panel body, with a first density of the at least two different densities being lower than a second density of the at least two different densities; and
    connectors to connect the panel body to the combustor liner with a line between the upstream portion and the downstream portion of the panel body being aligned with fluid-coolant injection apertures in the combustor liner.

2. The heat shield unit according to claim 1, wherein at least some of the pin fins in the second density are taller than at least some of the pin fins in the first density.

3. The heat shield unit according to claim 1, wherein at least some adjacent ones of the pin fins in the first density are spaced apart farther than that at least some adjacent ones of the pin fins in the first density.

4. The heat shield unit according to claim 1, wherein at least some of the pin fins in one of the densities have a greater sectional size than at least some of the pin fins in the other of the densities.

5. The heat shield unit according to claim 1, wherein the pin fins are cylinders.

6. The heat shield unit according to claim 1, wherein the connectors are posts projecting from the second surface.

7. A gas turbine engine combustor, comprising:
a combustor liner defining a combustion volume, with apertures in the combustor liner for insertion of coolant fluid in the combustion volume;
at least one heat shield unit comprising:
a panel body secured to the combustor liner, the panel body having a first surface oriented toward the combustion zone, and a second surface oriented toward the combustor liner, the panel body as a whole being railless;
pin fins projecting from the second surface of the panel body, the pin fins being arranged in arrays of at least two different densities of volume of pin fins per unit volume, with a first density of the at least two different densities being lower than a second density of the at least two different densities, with the panel body positioned relative to the apertures of the combustor liner for a location of the pin fins between the at least two densities to be opposite at least one of the apertures to receive the coolant fluid at said location between the at least two densities; and
connectors to connect the panel body to the combustor liner.

8. The gas turbine engine combustor according to claim 7, wherein at least some of the pin fins in the second density are taller than at least some of the pin fins in the first density.

9. The gas turbine engine combustor according to claim 7, wherein at least some adjacent ones of the pin fins in the first density are spaced apart farther than that at least some adjacent ones of the pin fins in the first density.

10. The gas turbine engine combustor according to claim 7, wherein at least some of the pin fins in one of the densities have a greater sectional size than at least some of the pin fins in the other of the densities.

11. The gas turbine engine combustor according to claim 7, wherein the pin fins are cylinders.

12. The gas turbine engine combustor according to claim 7, wherein the connectors are posts projecting from the second surface.

13. The gas turbine engine combustor according to claim 7, comprising at least two of said heat shield units, with the panel bodies of the heat shield units being adjacent and offset from one another, such that the coolant fluid portion exiting from passing through the pin fins of one of the heat shield units film cools the first surface of the other of the heat shield units.

14. The gas turbine engine combustor according to claim 7, wherein the pin fins opposite to the apertures are in an array of lower density than adjacent arrays of pin fins.

15. The gas turbine engine combustor according to claim 7, wherein the pin fins opposite to the apertures are in smaller than adjacent pin fins.

* * * * *